United States Patent
Alamond et al.

(10) Patent No.: US 8,122,564 B2
(45) Date of Patent: Feb. 28, 2012

(54) TUBE COUPLER

(75) Inventors: Robert F. Alamond, Texarkana, TX (US); Jeffery L Osterchill, Texarkana, AR (US); John R. Coffey, Texarkana, TX (US); John D. Allen, Texarkana, TX (US); Andrew L. Curtis, Hope, AR (US); Daniel T. Sparks, New Boston, TX (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 1277 days.

(21) Appl. No.: 11/754,599

(22) Filed: May 29, 2007

(65) Prior Publication Data

US 2008/0295279 A1    Dec. 4, 2008

(51) Int. Cl.
    *A47L 5/24* (2006.01)
(52) U.S. Cl. ............. 15/327.5; 15/344; 15/405; 15/414
(58) Field of Classification Search ............... 15/330, 15/327.5, 344, 345, 405, 414
    See application file for complete search history.

(56) References Cited

U.S. PATENT DOCUMENTS

| 3,618,157 | A | | 11/1971 | Bassin |
| 4,624,291 | A | * | 11/1986 | Compton et al. .................. 141/1 |
| 4,696,497 | A | * | 9/1987 | Schwarzensteiner ......... 285/307 |
| 4,779,651 | A | | 10/1988 | Hegler et al. |
| 4,870,714 | A | * | 10/1989 | Miner .......................... 15/327.5 |
| 5,003,662 | A | | 4/1991 | Everts |
| 5,035,586 | A | * | 7/1991 | Sadler et al. .................. 417/363 |
| 5,245,726 | A | * | 9/1993 | Rote et al. ........................ 15/339 |
| 5,462,311 | A | * | 10/1995 | Cipolla ............................. 285/7 |
| 5,682,924 | A | | 11/1997 | Powell |
| 5,685,044 | A | * | 11/1997 | Lavis et al. .................. 15/415.1 |
| 5,711,048 | A | * | 1/1998 | Pink et al. ........................ 15/347 |
| 5,943,872 | A | | 8/1999 | Sakurada et al. |
| 5,987,700 | A | * | 11/1999 | Edlund ........................... 15/420 |
| 6,041,824 | A | | 3/2000 | Powell |
| 6,108,865 | A | * | 8/2000 | Veser et al. .................... 15/414 |

(Continued)

FOREIGN PATENT DOCUMENTS

JP    05-010299    1/1993

(Continued)

OTHER PUBLICATIONS

International Search Report (PCT/US2008/064507) dated Sep. 9, 2008.

*Primary Examiner* — David Redding
(74) *Attorney, Agent, or Firm* — Pearne & Gordon LLP

(57) ABSTRACT

A powered blower/vacuum unit includes a base portion having a housing and a power air-moving device within the base portion. A tube is provided that is formed by a first manufacturing operation, such as a blow molding process. The tube extends a relatively large distance away from the housing and air flows through the tube along a relatively large distance. A coupler is also included for coupling the tube to the housing. The coupler is separately formed by a second, different manufacturing operation, such as an injection molding process. The coupler includes a plurality of one-way snap-in features configured to engage a plurality of receiver features located on the tube to non-removably attach the coupler to the tube. The housing can also include at least one male component and the coupler can include at least one complementary female component for securing the coupler to the housing.

35 Claims, 8 Drawing Sheets

U.S. PATENT DOCUMENTS

| | | |
|---|---|---|
| 6,135,158 A | 10/2000 | Kraus |
| 6,442,790 B1 * | 9/2002 | Svoboda et al. ............... 15/330 |
| 6,467,817 B1 * | 10/2002 | Rhyman ....................... 285/319 |
| 7,115,814 B2 * | 10/2006 | McCarthy et al. ........... 174/68.3 |
| 7,325,610 B2 * | 2/2008 | Giroux et al. ................. 166/291 |
| 7,328,479 B2 * | 2/2008 | Willenbring ................... 15/324 |
| 7,552,947 B2 * | 6/2009 | Ryhman ....................... 285/308 |
| 2006/0022465 A1 | 2/2006 | Yamauchi |
| 2006/0123581 A1 * | 6/2006 | O'Neal ........................... 15/319 |
| 2006/0123586 A1 * | 6/2006 | Wegelin et al. ................ 15/320 |
| 2008/0157520 A1 | 7/2008 | Ryhman |

FOREIGN PATENT DOCUMENTS

| | | |
|---|---|---|
| JP | 2004-506142 A | 2/2004 |
| KR | 10-1999-007110 A | 1/1999 |
| KR | 10-2006-0126648 A | 12/2006 |
| WO | 02/12770 | 2/2002 |

* cited by examiner

TUBE COUPLER

FIELD OF THE INVENTION

The present invention relates generally to a blower or vacuum unit for performing a blowing or vacuuming operation, and more particularly, to a coupler used for attaching a tube to a housing of a blower or vacuum unit.

BACKGROUND OF THE INVENTION

Existing blower designs use a single piece blow molded tube with a bayonet style attachment configuration into injection molded housings. Specifically, the designs include a twist-lock or bayonet-style retaining features. These types of designs require excessive assembly engagement to ensure a robust assembly and they do not facilitate a low profile housing when the tube is not installed.

One example of a known design is shown in FIG. 1D. This known design shows a relatively larger housing for coupling with a tube.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a powered blower/vacuum unit for performing a blowing/vacuuming operation is provided. The powered unit includes a base portion having a housing and a power air-moving device disposed therein for creating an air stream. An elongate tube extends a relatively large distance away from the housing and is adapted to permit at least the air stream to flow through the tube along the relatively large distance. The tube is formed by a first manufacturing operation. A coupler is adapted to couple the tube to the housing, and the coupler is separately formed by a second, different manufacturing operation. A plurality of receiver features are located on the tube, and a plurality of one-way snap-in features are located on the coupler adapted to engage the plurality of receiver features. The plurality of one-way snap-in features are engaged with the plurality of receiver features to non-removably attach the coupler to the tube.

In accordance with another aspect of the present invention, a method for providing a powered blower/vacuum unit for performing a blowing/vacuuming operation is included. The method includes the steps of providing a base portion having a housing and an air-moving device disposed therein for creating an air stream, and forming an elongate tube by a first manufacturing operation and providing a plurality of receiver features located on the tube. The tube is adapted to permit at least the air stream to flow through the tube. The method also includes the steps of forming a coupler by a second, different manufacturing operation, and providing a plurality of one-way snap-in features located on the coupler. The method also includes the steps of non-removably attaching the coupler to the tube by engaging the plurality of receiver features to the plurality of one-way snap-in features, and coupling the coupler to the housing.

In accordance with another aspect of the present invention, a powered blower/vacuum unit for performing a blowing/vacuuming operation is provided. The powered unit includes a base portion having a housing and a power air-moving device disposed therein for creating an air stream. The housing includes an opening and at least one male component located about the opening. An elongate tube extends a relatively large distance away from the housing and is adapted to permit at least the air stream to flow through the tube along the relatively large distance. The tube is formed by a first manufacturing operation. A coupler is adapted to couple the tube to the housing, and is separately formed by a second, different manufacturing operation. The coupler is non-removably attached to the tube. The coupler includes at least one complementary female component adapted to engage the at least one male component of the housing for securing the coupler to the housing.

In accordance with yet another aspect of the present invention, a method for providing a powered blower/vacuum unit for performing a blowing/vacuuming operation is included. The method includes the steps of providing a base portion having a housing and an air-moving device disposed therein for creating an air stream. The housing includes an opening and at least one male component located about the opening. The method also includes the step of forming an elongate tube by a first manufacturing operation, wherein the tube is adapted to permit at least the air stream to flow through the tube. The method also includes the step of forming a coupler by a second, different manufacturing operation, wherein the coupler including at least one complementary female component. The method also includes the steps of non-removably attaching the coupler to the tube, and securing the coupler to the housing. Each female component is configured to engage a complementary male component for securing the coupler to the housing.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 1D is presented to illustrate a comparison between prior art designs and one aspect of the subject invention;

DESCRIPTION OF EXAMPLE EMBODIMENTS

Figure 1A:
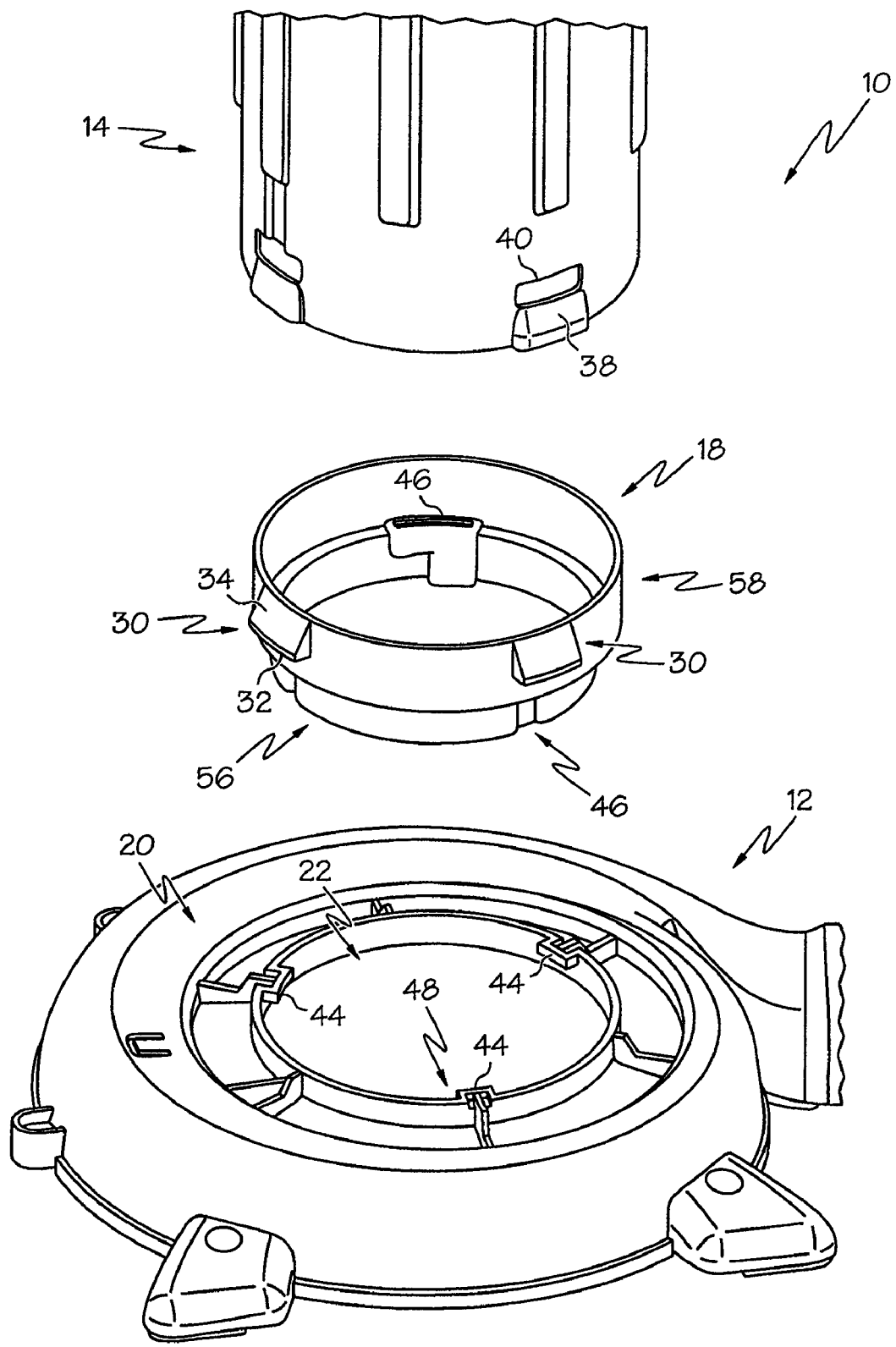
FIG. 1A is a perspective view of an exploded assembly of an example powered unit and shows a tube fragment, a coupler, and a housing before they are placed in engagement with one another.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to the shown example of FIG. 1A, it is to be appreciated that a powered unit 10 is provided that performs a blowing or vacuuming operation. Many different embodiments and configurations are contemplated by the subject invention. The powered unit can even be capable of a user selecting between a blowing or vacuuming operation. The powered unit 10 includes a base portion 12, a tube 14, and a coupler 18. The base portion 12 includes a housing 20 and a power air-moving device (not shown) that can include many different embodiments, such as axial or centrifugal fans, impellers, etc. for creating an air stream. As can be appreciated, the air-moving device can create an intake air stream (e.g., a vacuum air stream for suction) and/or an exhaust air stream (e.g., a pressured air stream for blowing). The air-moving device can be powered by an electric motor or a gasoline engine, and can adapted for use as a vacuum device and/or blower device. A handle (not shown) can be provided on the powered unit 10, and it is appreciated that many types of handle configurations are possible. The housing 20 has an opening 22 and a structure that accommodates the power air-moving device. The air-moving device and the associated structure for accommodating the air-moving device are within the comprehension of the person of ordinary skill in the art and are not discussed in detail herein. The opening 22 in the housing 20 provides an airflow path between the powered air-moving device, the coupler 18, and the tube 14. In some embodiments, the housing 20 can be only part of the base portion 12 and the housing 20 can engage an additional housing portion (not shown). In other embodiments, the housing 20 can be the only structure that engages the power air-moving device. In the embodiment shown, the housing 20 includes one portion with a generally circular shape though other shapes can be used.

Figure 2A:
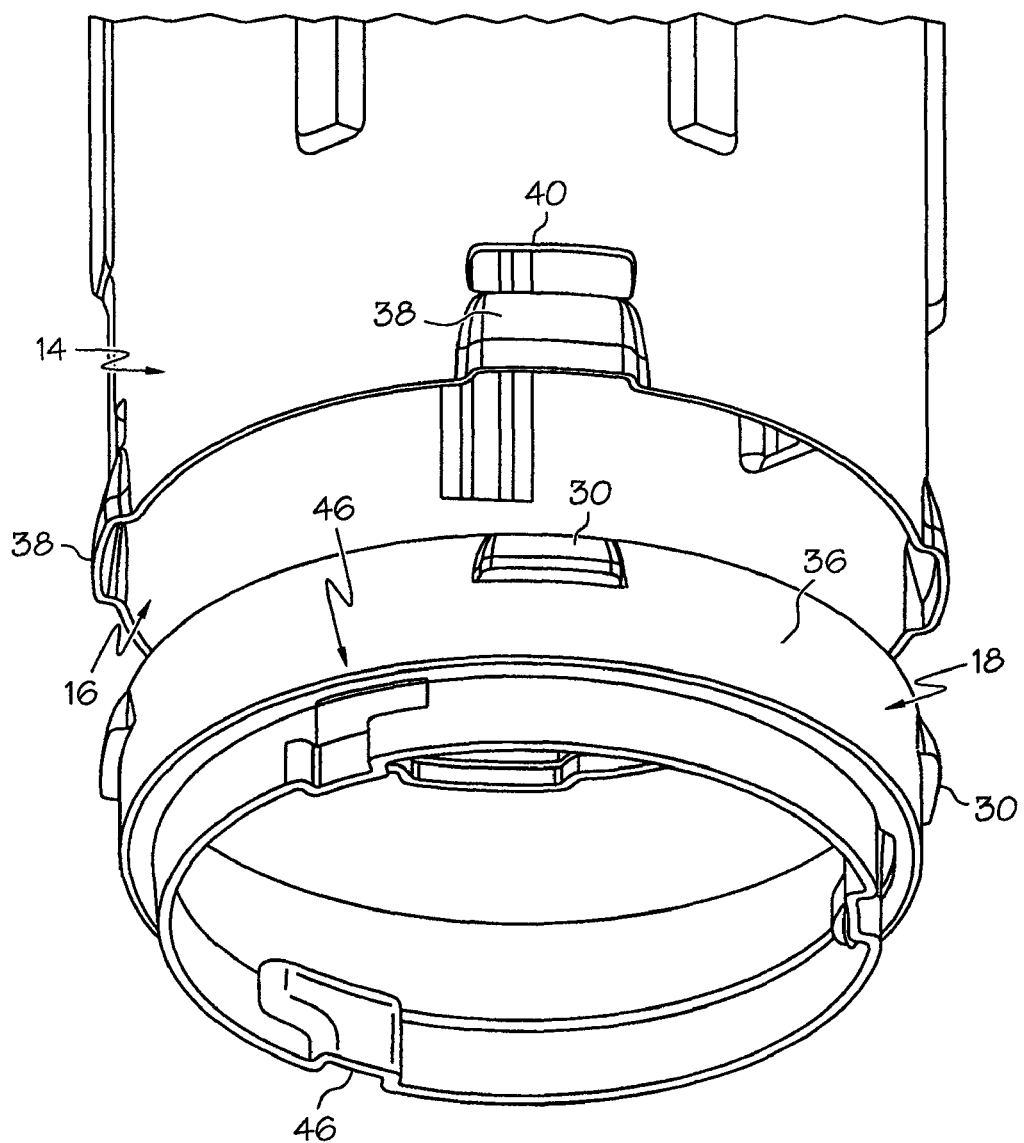
FIG. 2A is a perspective view of the coupler and the tube fragment during an assembly step.

The tube 14 can extend a relatively large distance away from the housing. The tube 14 is substantially cylindrical, though other shapes can be used. As seen in FIG. 2A, the tube 14 has a tube opening 16 and at least air flows to or from the housing 20 through the tube opening 16 of the tube 14 over a relatively large distance. The tube 14 can be a vacuum tube 14 for ingesting debris in addition to air. The tube 14 can also be a blower tube 14 for ejecting air. In the shown example, the tube 14 is formed by a first manufacturing operation which can be a blow molding operation using a blow-molded material, though other operations can be used.

Figure 2B:
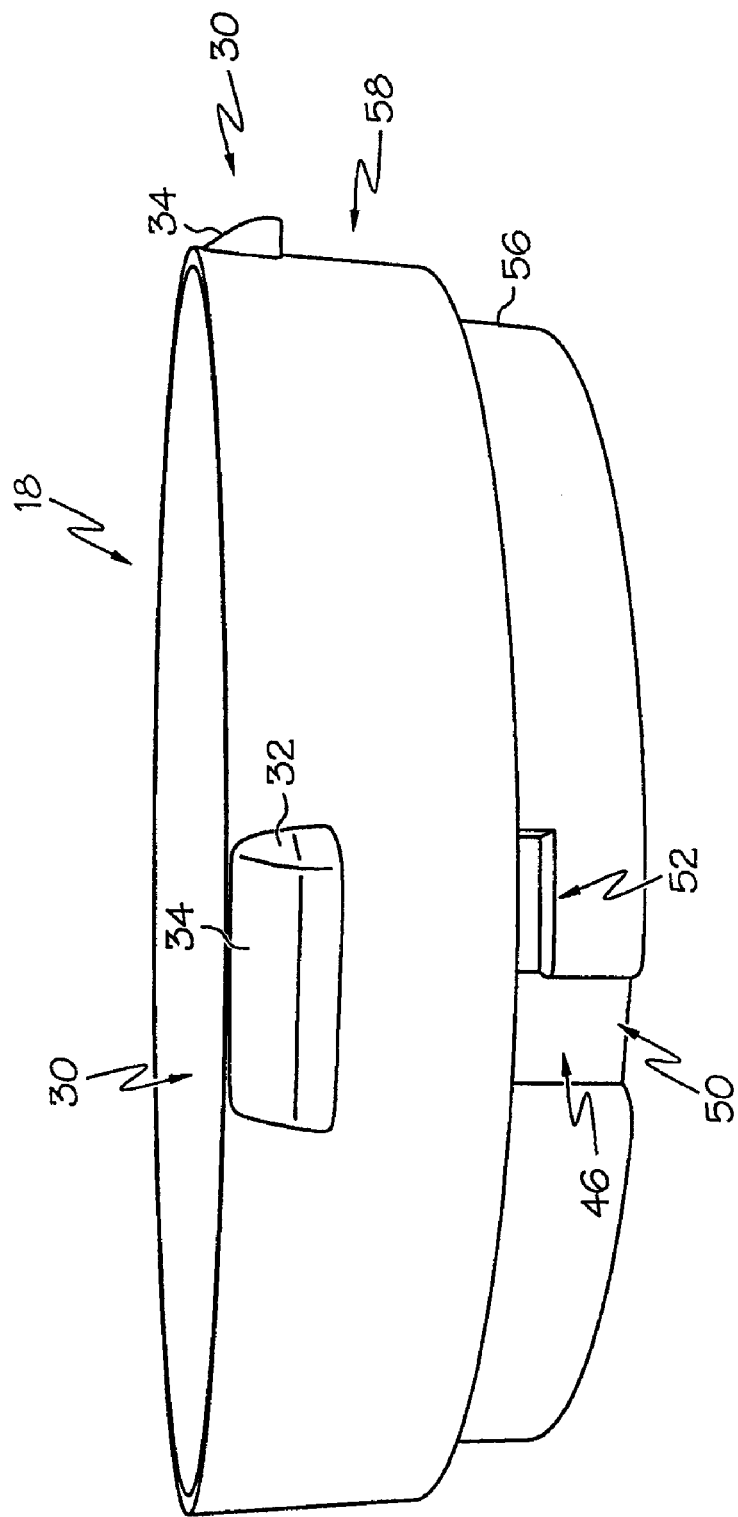
FIG. 2B is a perspective view of the coupler.
Figure 3:
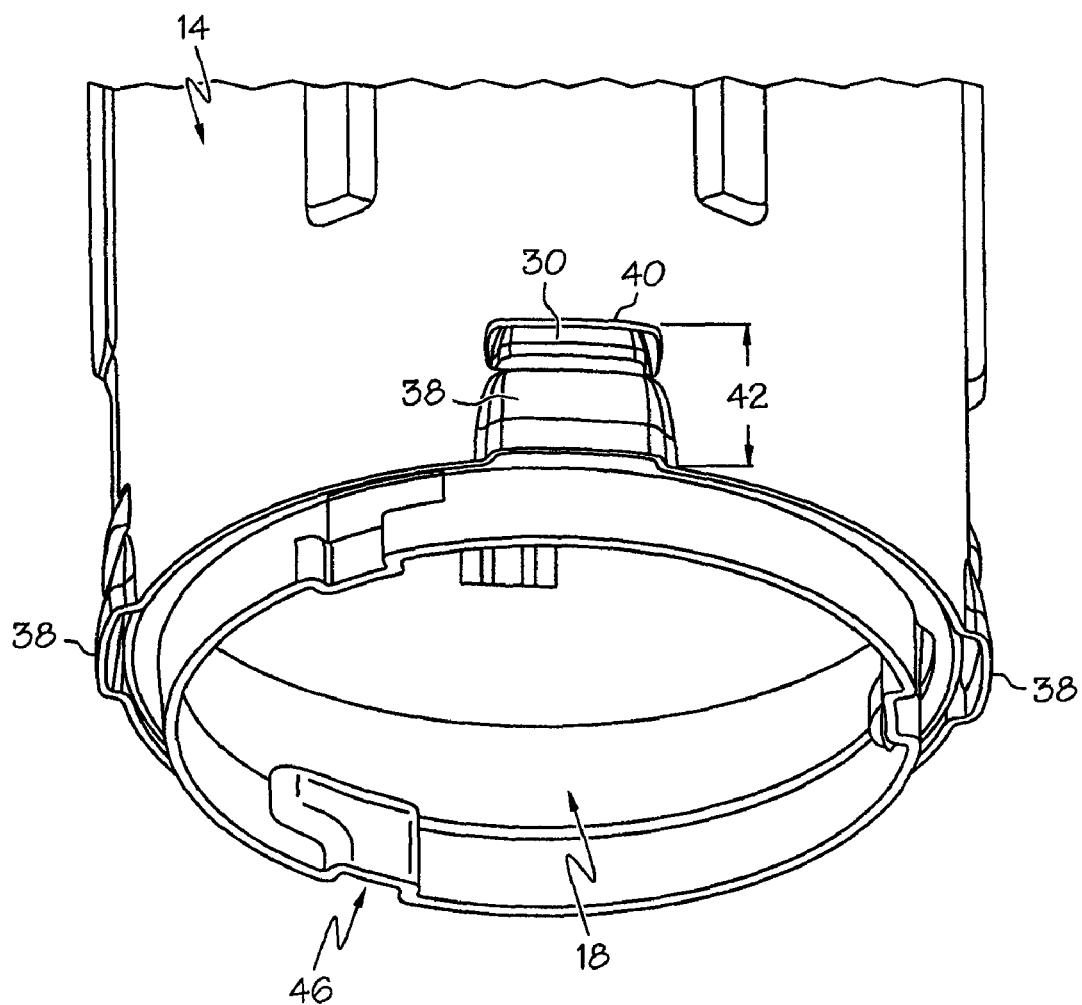
FIG. 3 is a perspective view of the coupler in engagement with the tube fragment.

As seen in FIG. 2A and FIG. 2B, the coupler 18 has a substantially cylindrical shape. FIG. 2A shows the coupler 18 before it is placed in engagement with the tube 14. The coupler 18 includes a first portion 56 that engages the housing 20 and includes a second portion 58 that engages the tube 14. In the shown example, the coupler 18 is made of an injection molded material separate from the tube 14 and the coupler 18 is formed by a second manufacturing operation, such as an injection molding operation. In this example, the coupler 18 has a plurality of one-way snap-in features 30 located on an exterior surface 36 of the coupler 18. In the shown example, the one-way snap-in features 30 on the coupler 18 includes protrusions 32 with angled front surfaces 34. The tube 14 has a plurality of receiver features 38. The receiver features 38 can include apertures 40 for receiving and securing the one-way snap-in features 30. For example, the protrusions 32 can slide into the receiver features 38 and the protrusions 32 then become engaged in the apertures 40. In this embodiment, the protrusions 32 not only engage the apertures 40 but the protrusions 32 also can extend through the apertures 40, as seen in FIG. 3. The receiver features 38 in this embodiment include angled openings that extend away from the structure of the tube 14 to facilitate assembly. Other types of receiver features can be utilized without having structures that are angled. The snap-in features 30 are configured to engage the plurality of receiver features 38 to non-removably attach the coupler 18 to the tube 14. In other embodiments, other structures can be used that are configured for non-removably attaching the tube 14 to the coupler 18. For example, the tube 14 can be attached to the coupler 18 by the use of various fasteners or adhesives. A fastener or adhesive structure can engage the tube 14 to non-removably attach the tube 14 to the coupler 18. Alternatively, the tube 14 can also be attached to the coupler 18 by the use of a material distortion operation, such as welding or staking. The tube 14 can also be configured for non-removable attachment with the coupler by the use of various combinations of different structures, such as using snap-in features 30 in combination with other fasteners, adhesives, or material distortion operations.

In the example shown in FIG. 2B, the angled front surfaces 34 provide a means for the one-way snap-in features 30 to easily slide into engagement with the receiver features 38. The angled front surfaces 34 enable the one-way snap-in features 30 to slide into a secured position where each protrusion 32 is surrounded by a receiver feature 38. Other types of structures or protrusions, with varying shapes, dimensions, and orientations can be used to provide a snap-in engagement between the coupler 18 and the tube 14.

Figure 1B:
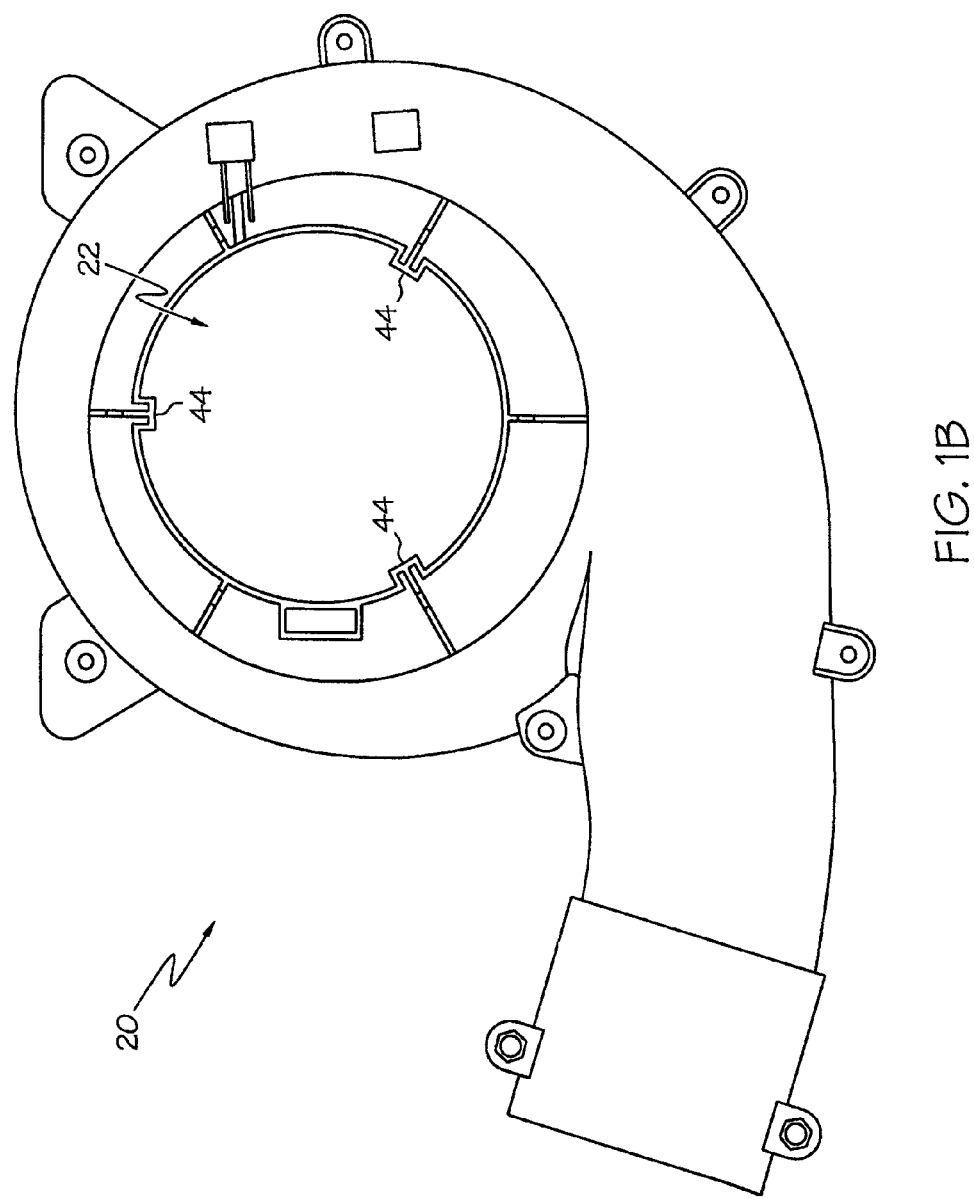
FIG. 1B is a top view of the housing and also shows an opening in the housing in which the coupler mates.
Figure 1C:
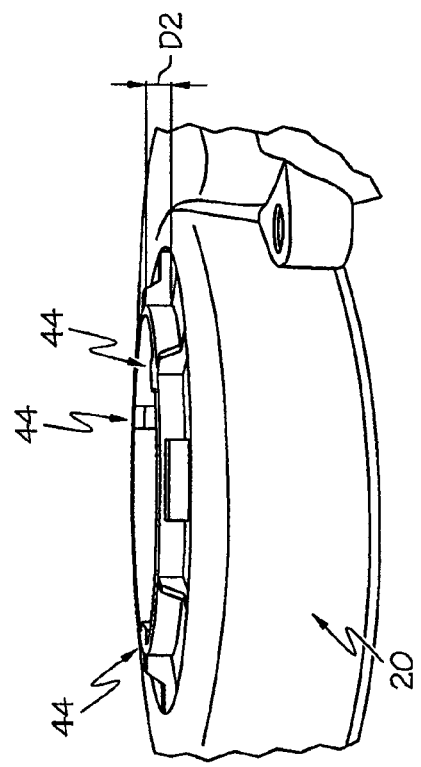
FIG. 1C is a fragment, perspective of the housing.
Figure 1D:
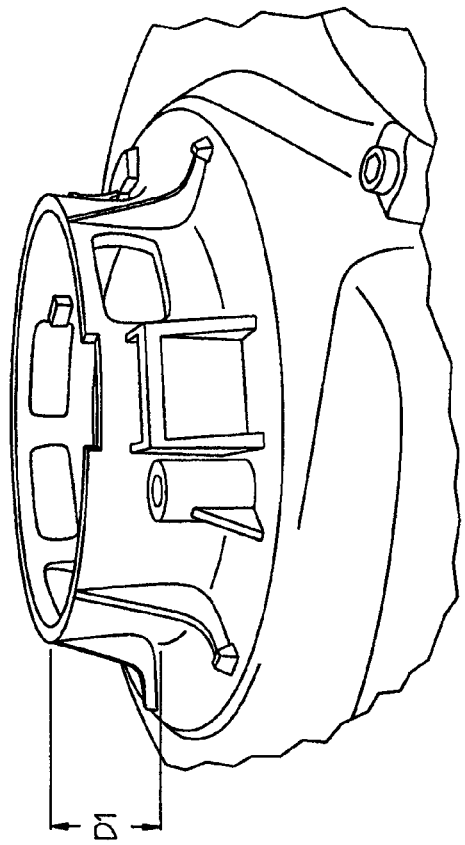
FIG. 1D is a prior art figure that is a fragment perspective view of a prior art housing, where

As seen in FIG. 1C and FIG. 1D, a comparison is shown between an example of the subject invention and a prior art design shown in part in FIG. 1D. The subject invention has a two-part design including a coupler and a tube that are attached to a housing 20. As seen in FIG. 1C, the shown example has a dimension D2 on the housing 20 representing the length of the housing 20 that is used to provide an engagement with the tube 14. The prior art design, shown in FIG. 1D, uses a one-piece blow molded design with a housing that has a much larger dimension D1. The combination of the coupler 18 and the tube 14 in the subject invention allows the size of the housing 20 to be reduced when compared to prior art arrangements. The reduction (i.e. D2<D1) can be attributed to the fact that the coupler 18 provides a better ability to engage and retain engagement as compared to the blow-molded tube that would be associated with the prior art design of FIG. 1D. For example, the engagement surfaces may mate with a lesser tolerance and thus be in tighter engagement. As another example, the coupler 18 may be stronger and/or thicker as compared to a blow molded tube of the prior art designs. As yet another example, the coupler 18 has a rigidity that is greater than the rigidity of the tube 14.

Figure 5:
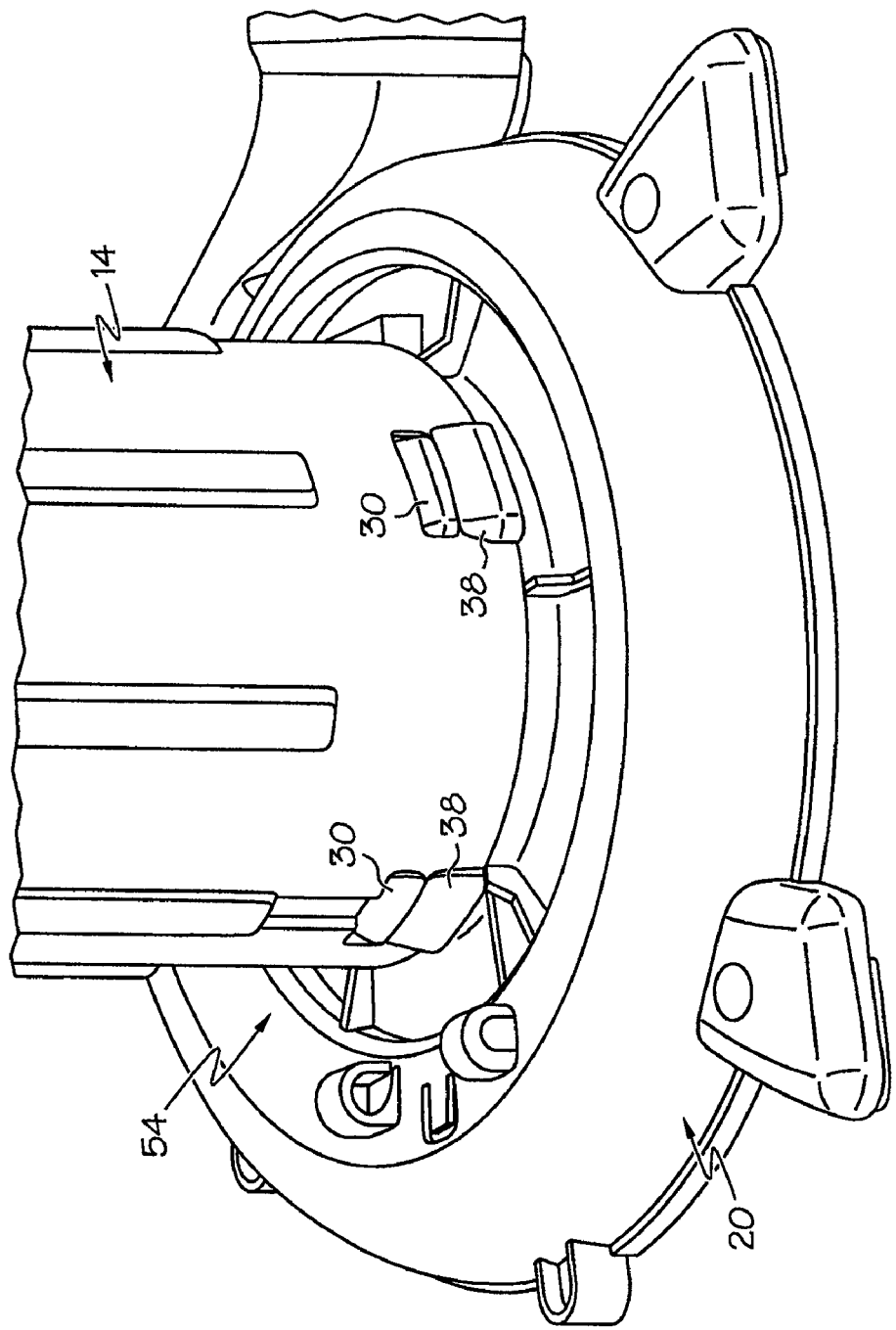
FIG. 5 is a perspective view of the housing in engagement with the coupler, which is in engagement with the tube.

As seen in FIG. 1A, an exploded assembly of the housing 20, the coupler 18, and the tube 14 are shown. FIG. 1A shows an example orientation of the tube 14, the coupler 18, and the housing 20 before they are each placed in engagement with one another in the subject invention. The coupler 18 can have a relatively short extent or dimension in relation to the tube 14 and the tube 14 can have a relatively longer extent or dimension. In one example, the tube 14 can have a length greater than 24 inches and the coupler 18 can have a length less than 2 inches. In one example, a portion 42 of the tube 14 overlaps the coupler 18 when the tube 14 and the coupler 18 are in engagement, as seen in FIG. 3, though other arrangements are possible depending on the type of snap-in features 30 located on the coupler 18 and the receiver features 38 located on the tube 14. The portion 42 of the tube 14 that overlaps the coupler 18 can have a length less than 1 inch. In another example, a portion of the coupler 18 can overlap a portion of the housing 20, as generally seen in FIG. 5. The portion of the coupler 18 that overlaps the portion of the housing 20 can have a length less than ½ inch. Of course, other overlapping arrangements can be achieved with the subject invention. The coupler 18 can also have a rigidity that is greater than a rigidity of the tube 14. The rigidity of the coupler 18 can be greater than the rigidity of the tube 14 by the selection of a different manufacturing operation.

Figure 4:
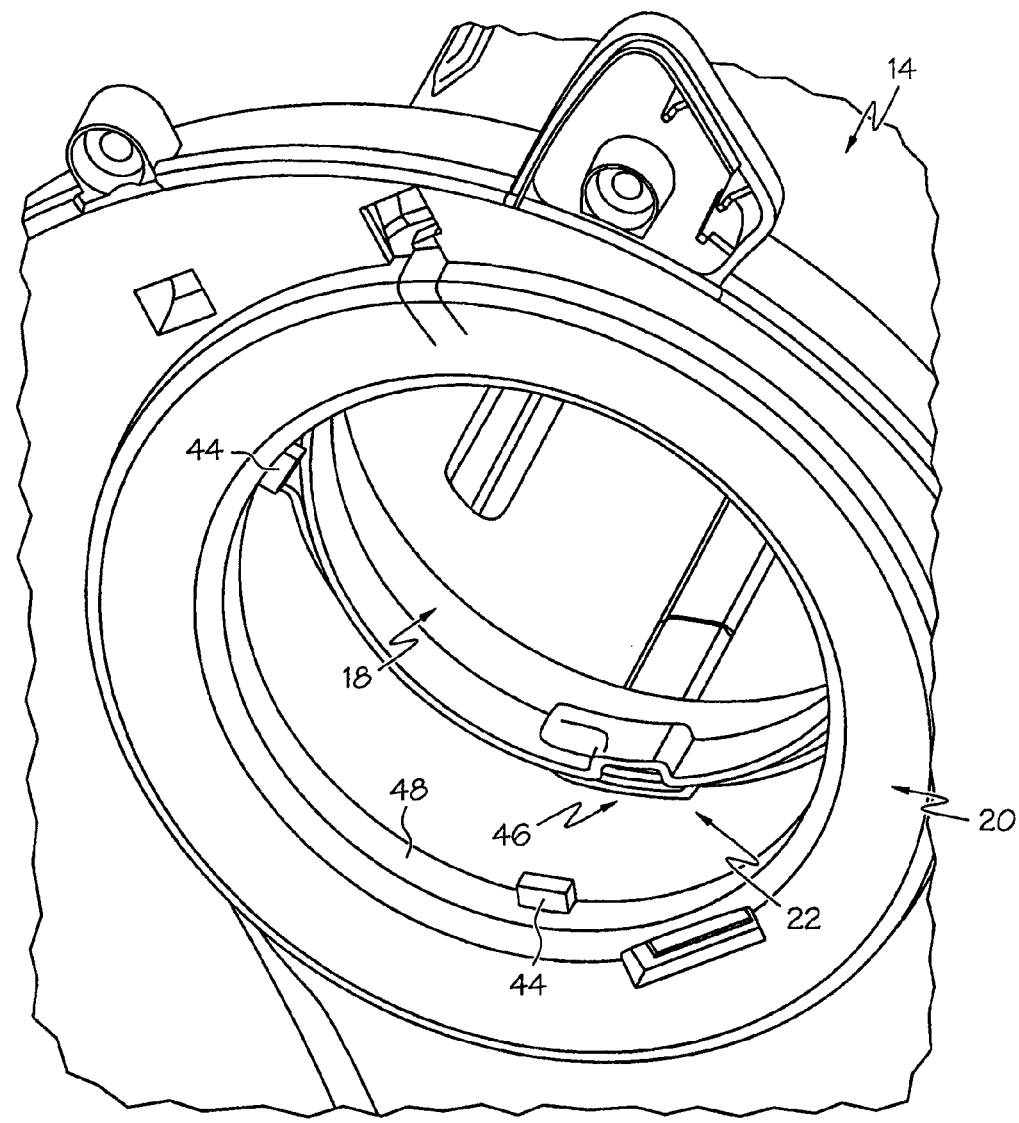
FIG. 4 is a reverse-angle perspective view of the coupler and the tube as the coupler is about to receive male components of the housing.

In another example embodiment, shown in FIG. 1B and FIG. 4, the opening 22 on the housing 20 can include at least one male component 44 that can be located on an inner edge 48 of the opening 22 of the housing 20. The at least one male component 44 can be located in different locations and different orientations with respect to the opening 22. The number of male components 44 does not necessarily correspond with the number of one-way snap-in features 30 on the coupler 18. For example, there can be three male components 44 and four one-way snap-in features 30. In the example embodiment shown, the at least one male component 44 protrudes inwards towards a center of the opening 22 and the female components 46 can protrude inwards, as best seen in FIG. 3, to complement the male components 44 that protrude inwards. In the embodiment shown in FIG. 1B, the male components 44 can have a generally rectangular shape, though other shapes can be utilized. The overall size of the housing 20, which can be molded, can be reduced when compared to alternative and prior art tube attachment styles by having at least one male component that protrudes inwards as opposed to the male components protruding in a transverse direction.

As seen in FIG. 2B, the coupler 18 can have at least one complementary female component 46 located on the coupler 18. Each female component 46 is configured to engage a complementary male component 44 for securing the coupler 18 to the housing 20. In other embodiments, the male 44 and female components 46 can form a bayonet connection, though other types of structures can also be utilized. In one example of a bayonet connection, each female component 46 can include an axially-extending insertion area 50 that is configured for insertion of the male component 44. A transversely-extending sliding area 52 can also be provided that is configured for each male component 44 to reach a secured position 54. FIG. 2B shows a sectional view of an example coupler 18 and shows specifically the axially-extending insertion area 50 and the transversely-extending sliding area 52. Accordingly, once the tube 14 is in engagement with the coupler 18, the tube 14 is secured with the housing 20 by positioning the coupler 18 to receive the male components 44 from the housing 20. The male component 44 of the housing 20 can enter the axially-extending insertion area 50 and can be inserted as far as it can move in an axial direction. The tube 14 and the coupler 18 can then be twisted to move the male component 44 within the transversely-extending sliding area 52. The male component 44 is moved as far as possible in the transversely-extending sliding area 52 by twisting the tube 14 to place the assembly in the secured position 54 (seen in FIG. 5). The male component 44 securely engages the coupler 18 to the tube 14 and the coupler 18 to the housing 20 when the assembly is in the secured position 54. In the secured position 54, the tube 14 and the coupler 18 are secured to the housing 20 because another twisting motion is needed to move the male component 44 to a position where the tube 14 and the coupler 18 can be removed from the housing 20. The length of the axially-extending insertion area 50 can be less than 1 inch in one embodiment. The coupler 18 in this example can also have sufficient rigidity to retain the coupler 18 with the attached tube 14 onto the housing 20. Many different shapes for the male component 44 and the female component 46 are possible for obtaining a bayonet connection between the coupler 18 and the tube 14. The female component 46 can also include multiple segments of insertion areas and sliding areas as well as different shaped insertion areas and sliding areas.

In another example embodiment, the coupler 18 includes a first portion 56 and a second portion 58. The first portion 56 of the coupler 18 is sized for insertion into the housing 20. In this example, the first portion 56 also includes each female component 46 that is configured to engage the complementary male component 44 for securing the coupler 18 to the housing 20. The second portion 58 of the coupler 18 can be sized not to fit into the housing 20 and can act as a shoulder against the outside of the housing 20. The second portion 58 can include the one-way snap-in features 30 and the second portion 58 can be sized for engagement with the tube 14.

In an example embodiment of a methodology involving the subject invention, a method for providing a powered blower/vacuum unit for performing a blowing or vacuuming operation includes providing a base portion 12. The base portion 12 includes a housing 20 and an air-moving device. A tube 14 is provided for extending a relatively large distance from the housing 20. Air flows through the tube 14 along the relatively large distance. Providing the tube includes forming the tube 14 by a first manufacturing operation and forming a plurality of receiver features 38 on the tube 14. A coupler 18 is provided and the coupler is formed by a second, different manufacturing operation. The second manufacturing operation, in one embodiment, also provides a plurality of one-way snap-in features 30 on the coupler 18. The first manufacturing operation for forming the tube 14 can be a blow molding process and the second manufacturing operation for forming a coupler 18 can be an injection molding process. Providing an injection molded coupler 18 in any of the embodiments of the subject invention helps to improve the rigidity of the coupler 18 and to create positive retention. Providing a tube 14 by a blow molding process can include heating a material.

The method in one embodiment also includes non-removably attaching the coupler 18 to the tube 14 by having one-way snap-in features 30 located on the coupler 18 engage a plurality of receiver features 38 located on the tube 14. FIG. 2A shows the coupler 18 before it is placed in engagement with the tube 14. Non-removably attaching the coupler 18 to the tube 14 can also be performed by forcing the snap-in features 30 on the coupler 18 into the plurality of receiver features 38 on the tube, as seen in FIG. 3. Moreover, non-removably attaching the coupler 18 to the tube 14 can include engaging the plurality of receiver features 38 to the one-way snap-in features 30 while the coupler 18 is still warm to permit the tube 14 to cool and form about the coupler 18.

The method also includes coupling the coupler 18 to the housing 20. FIG. 4 shows the coupler 18 already attached to the tube 14 before the coupler 18 is placed in engagement with the housing 20. The coupler 18 can then be positioned to receive the male components 44 from the housing 20. Coupling can be performed by having male components 44, located on an opening 22 of the housing 20, which engage female components 46, located on the coupler 18. FIG. 5 shows one example of the assembly after the housing 20 is placed in engagement with the coupler 18, which is in engagement with the tube 14. FIG. 5 generally shows the coupler 18 and the tube 14 in the secured position 54 with the housing 20. In another embodiment, the coupling action can be performed by twisting the tube 14 into a secured position 54 due to a bayonet connection between the coupler 18 and the housing 20. In an alternative embodiment of the method, a base portion is provided along with a tube 14 and a coupler 18. The coupler 18 is non-removably attached to the tube 14, either by snap-in features, a material distortion operation, at least one fastener, or by the use of at least one adhesive. The housing 20 in this embodiment includes at least one male component 44 located at an opening 22 of the housing 20. The coupler 18 includes at least one complementary female component 46 located on the coupler 18, where each female component 46 is configured to engage a complementary male component 44 for securing the coupler 18 to the housing 20.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A powered blower/vacuum unit for performing a blowing/vacuuming operation, the powered unit including:
  a base portion having a housing and a power air-moving device disposed therein for creating an air stream;
  an elongate tube extending a relatively large distance away from the housing and adapted to permit at least the air stream to flow through the tube along the relatively large distance, the tube being formed by a first manufacturing operation;
  a coupler adapted to couple the tube to the housing, the coupler being separately formed by a second, different manufacturing operation;
  a plurality of receiver features located on the tube; and
  a plurality of one-way snap-in features located on the coupler adapted to engage the plurality of receiver features, the plurality of one-way snap-in features being engaged with the plurality of receiver features to non-removably attach the coupler to the tube.

2. A powered unit according to claim 1, wherein the tube is made of blow-molded material and the first manufacturing operation is a blow molding operation, and wherein the coupler is made of injection molded material separate from the tube and the second, different manufacturing operation is an injection molding operation.

3. A powered unit according to claim 1, wherein the tube has a relatively long extent, the coupler has a relatively short extent, and a portion of the tube overlaps a portion of the coupler.

4. A powered unit according to claim 1, wherein the coupler has a rigidity that is greater than a rigidity of the tube.

5. A powered unit according to claim 1, wherein the coupler has sufficient rigidity to retain the coupler, with the tube, onto the housing.

6. A powered blower/vacuum unit for performing a blowing/vacuuming operation, the powered unit including:
  a base portion having a housing and a power air-moving device disposed therein for creating an air stream;
  an elongate tube extending a relatively large distance away from the housing and adapted to permit at least the air stream to flow through the tube along the relatively large distance, the tube being formed by a first manufacturing operation;
  a coupler adapted to couple the tube to the housing, the coupler being separately formed by a second, different manufacturing operation;
  a plurality of receiver features located on the tube; and
  a plurality of one-way snap-in features located on the coupler adapted to engage the plurality of receiver features, the plurality of one-way snap-in features being engaged with the plurality of receiver features to non-removably attach the coupler to the tube;
  wherein the housing includes an opening and at least one male component located about the opening, and the coupler includes at least one complementary female component adapted to engage the at least one male component for securing the coupler to the housing.

7. A powered unit according to claim 6, wherein each male component protrudes inwardly towards a center of the opening of the housing.

8. A powered unit according to claim 6, wherein the at least one male component and the complementary female component are adapted to form a bayonet connection.

9. A powered unit according to claim 8, wherein each female component includes an axially-extending insertion area configured for insertion of the complementary male component, and a transversely-extending sliding area configured for the complementary male component to reach a secured position.

10. A powered unit according to claim 6, wherein a first portion of the coupler is sized for insertion into the housing, each female component being located at the first portion, and a second portion of the coupler is sized not to fit into the housing and to engage against the outside of the housing as a shoulder.

11. A powered unit according to claim 1, wherein the tube is a vacuum tube for ingesting debris in addition to the air stream.

12. A method for providing a powered blower/vacuum unit for performing a blowing/vacuuming operation, the method including:
  providing a base portion having a housing and an air-moving device disposed therein for creating an air stream;
  forming an elongate tube by a first manufacturing operation and providing a plurality of receiver features located on the tube, the tube being adapted to permit at least the air stream to flow through the tube;
  forming a coupler by a second, different manufacturing operation and providing a plurality of one-way snap-in features located on the coupler;
  non-removably attaching the coupler to the tube by engaging the plurality of receiver features to the plurality of one-way snap-in features; and
  coupling the coupler to the housing.

13. A method according to claim 12, wherein non-removably attaching the coupler to the tube further includes the step of forcing the plurality of one-way snap-in features of the coupler into the plurality of receiver features on the tube.

14. A method according to claim 12, wherein forming the elongate tube by a first manufacturing operation further includes the step of forming the tube by a blow molding process, and wherein forming the coupler by a second, different manufacturing operation further includes the step of forming the coupler by an injection molding process.

15. A method according to claim 14, wherein forming the tube by the blow molding process includes heating a material, and non-removably attaching the coupler to the tube includes engaging the plurality of one-way snap-in features to the plurality of receiver features while the coupler is still warm to permit the tube to cool and form about the coupler.

16. A method for providing a powered blower/vacuum unit for performing a blowing/vacuuming operation, the method including:
- providing a base portion having a housing and an air-moving device disposed therein for creating an air stream;
- forming an elongate tube by a first manufacturing operation and providing a plurality of receiver features located on the tube, the tube being adapted to permit at least the air stream to flow through the tube;
- forming a coupler by a second, different manufacturing operation and providing a plurality of one-way snap-in features located on the coupler;
- non-removably attaching the coupler to the tube by engaging the plurality of receiver features to the plurality of one-way snap-in features; and
- coupling the coupler to the housing;
- wherein the housing includes an opening and at least one male component located about the opening, and the coupler includes at least one complementary female component adapted to engage the at least one male component for securing the coupler to the housing.

17. A method according to claim 16, wherein each male component protrudes inwardly towards a center of the opening of the housing.

18. A method according to claim 16, wherein the at least one male component and the complementary female component are adapted to form a bayonet connection.

19. A method according to claim 16, wherein each female component includes an axially-extending insertion area configured for insertion of the complementary male component and a transversely-extending sliding area configured for the complementary male component to reach a secured position.

20. A method according to claim 16, wherein a first portion of the coupler is sized for insertion into the housing, each female component being located at the first portion, and a second portion of the coupler is sized not to fit into the housing and to engage against the outside of the housing as a shoulder.

21. A powered blower/vacuum unit for performing a blowing/vacuuming operation, the powered unit including:
- a base portion having a housing and a power air-moving device disposed therein for creating an air stream, the housing including an opening and at least one male component located about the opening;
- an elongate tube extending a relatively large distance away from the housing and adapted to permit at least the air stream to flow through the tube along the relatively large distance, the tube being formed by a first manufacturing operation;
- a coupler adapted to couple the tube to the housing, the coupler being separately formed by a second, different manufacturing operation, the coupler being non-removably attached to the tube,
- the coupler including at least one complementary female component adapted to engage the at least one male component of the housing for securing the coupler to the housing.

22. A powered unit according to claim 21, wherein each male component protrudes inwardly towards a center of the opening of the housing.

23. A powered unit according to claim 21, wherein the tube is made of blow-molded material and the first manufacturing operation is a blow molding operation, and wherein the coupler is made of injection molded material separate from the tube and the second, different manufacturing operation is an injection molding operation.

24. A powered unit according to claim 21, wherein each female component includes an axially-extending insertion area configured for insertion of the complementary male component and a transversely-extending sliding area configured for the complementary male component to reach a secured position.

25. A powered unit according to claim 21, wherein a first portion of the coupler is sized for insertion into the housing, each female component being located at the first portion, and a second portion of the coupler is sized not to fit into the housing and to engage against the outside of the housing as a shoulder.

26. A powered unit according to claim 21, further including at least one fastener or adhesive engaging the tube, the fastener or adhesive being configured to non-removably attach the tube to the coupler.

27. A method for providing a powered blower/vacuum unit for performing a blowing/vacuuming operation, the method including:
- providing a base portion having a housing and an air-moving device disposed therein for creating an air stream, wherein the housing includes an opening and at least one male component located about the opening;
- forming an elongate tube by a first manufacturing operation, the tube being adapted to permit at least the air stream to flow through the tube;
- forming a coupler by a second, different manufacturing operation, the coupler including at least one complementary female component;
- non-removably attaching the coupler to the tube; and
- securing the coupler to the housing, wherein each female component is configured to engage a complementary male component for securing the coupler to the housing.

28. A method according to claim 27, wherein non-removably attaching the coupler to the tube further includes the step of forcing the plurality of one-way snap-in features of the coupler into the plurality of receiver features on the tube.

29. A method according to claim 27, wherein forming the elongate tube by a first manufacturing operation further includes the step of forming the tube by a blow molding process, and wherein forming the coupler by a second, different manufacturing operation further includes the step of forming the coupler by an injection molding process.

30. A method according to claim 29, wherein forming the tube by the blow molding process includes heating a material, and non-removably attaching the coupler to the tube includes engaging the plurality of one-way snap-in features to the plurality of receiver features while the coupler is still warm to permit the tube to cool and form about the coupler.

31. A method according to claim 27, wherein non-removably attaching the coupler to the tube includes a material distortion operation.

32. A method according to claim 27, wherein non-removably attaching the coupler to the tube includes providing at least one fastener or adhesive to engage the tube, the fastener or adhesive being configured to non-removably attach the tube to the coupler.

33. A method according to claim 27, wherein each male component protrudes inwardly towards a center of the opening of the housing.

34. A method according to claim 27, wherein each female component includes an axially-extending insertion area configured for insertion of the complementary male component and a transversely-extending sliding area configured for the complementary male component to reach a secured position.

35. A method according to claim 27, wherein a first portion of the coupler is sized for insertion into the housing, each female component being located at the first portion, and a second portion of the coupler is sized not to fit into the housing and to engage against the outside of the housing as a shoulder.

* * * * *